United States Patent [19]

Chu et al.

[11] Patent Number: 5,095,074
[45] Date of Patent: Mar. 10, 1992

[54] THERMOSETTABLE RESIN COMPOSITIONS

[75] Inventors: Sung G. Chu; Harold Jabloner; Tuyen T. Nguyen, all of Wilmington, Del.

[73] Assignee: Hercules Incorporated, Wilmington, Del.

[21] Appl. No.: 503,023

[22] Filed: Apr. 2, 1990

Related U.S. Application Data

[62] Division of Ser. No. 86,137, Aug. 17, 1987, Pat. No. 4,962,161.

[51] Int. Cl.$^5$ .............................................. C08F 283/04
[52] U.S. Cl. .................................... 525/422; 524/547; 524/548; 526/262
[58] Field of Search ................ 524/547, 548; 525/422; 526/262

[56] References Cited

U.S. PATENT DOCUMENTS

| 4,035,345 | 7/1977 | Ducloux et al. | 260/78 UA |
| 4,100,140 | 7/1978 | Zahir et al. | 526/90 |
| 4,298,720 | 11/1981 | Yamazaki et al. | 526/262 |
| 4,389,516 | 6/1982 | Sugio et al. | 525/534 |
| 4,463,147 | 7/1984 | Diethelm et al. | 526/262 |
| 4,608,426 | 8/1986 | Stern | 528/170 |
| 4,609,705 | 9/1986 | Crivello et al. | 526/262 |
| 4,678,849 | 7/1987 | Liu et al. | 526/262 |
| 4,689,378 | 8/1987 | Chaudhari et al. | 526/262 |
| 4,789,704 | 12/1988 | Stenzenberger et al. | 526/262 |
| 4,822,870 | 4/1989 | Restaino | 526/262 |

FOREIGN PATENT DOCUMENTS 2054618  2/1981  United Kingdom .

Primary Examiner—Joseph L. Schofer
Assistant Examiner—J. M. Reddick
Attorney, Agent, or Firm—Mark Goldberg

[57] ABSTRACT

A novel polyfunctional maleimide-based thermosettable resin composition comprising: (a) at least one polyfunctional maleimide compound selected from the group consisting of bismaleimide and polymaleimide, and (b) at least one ether derivative of an alkenylphenol.

6 Claims, No Drawings

THERMOSETTABLE RESIN COMPOSITIONS

This application is a division, of application Ser. No. 07/086,137, filed Aug. 17, 1987, now U.S. Pat. No. 4,962,161.

FIELD OF THE INVENTION

This invention concerns novel polyfunctional maleimide-based thermosettable resin compositions having improved processing capability. This invention further concerns prepregs and composite materials manufactured from such resin compositions.

BACKGROUND OF THE INVENTION

Polyfunctional maleimide-based thermosettable resins, such as bismaleimide-based or polymaleimide-based resins, are known to have excellent heat resistance properties and thus are particularly suited for use in applications such as the manufacture of impregnating resins for use in high temperature resistant advanced fiber reinforced composite have played a significant role in the manufacture of primary, secondary and empennage structures for the aerospace industry in addition to applications in the automobile and electronics industry. The use of such resins, however, has been limited due to processing difficulties, since most commercially available bismaleimides and polymaleimides are high melting solids.

It is, therefore, an object of this invention to provide a novel improved polyfunctional maleimide-based thermosettable resin composition having improved processing characteristics. It is a further object of this invention to provide prepregs and composite materials manufactured from such resin compositions.

SUMMARY OF THE INVENTION

It has now been found that polyfunctional maleimide-based thermosettable resin compositions having improved processing capability can be provided by a composition comprising: (a) at least one polyfunctional maleimide compound selected from the group consisting of bismaleimide and polymaleimide, and (b) at least one ether derivative of an alkenylphenol.

This invention is further illustrated by the following detailed description.

DETAILED DESCRIPTION OF THE INVENTION

In accordance with the invention, a thermosettable resin composition is provided comprising: (a) at least one polyfunctional maleimide compound selected from the group consisting of (i) bismaleimide and (ii) polymaleimide, having the respective general formulas:

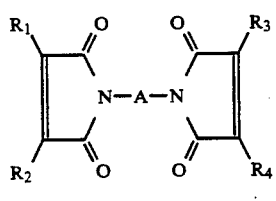
(i)

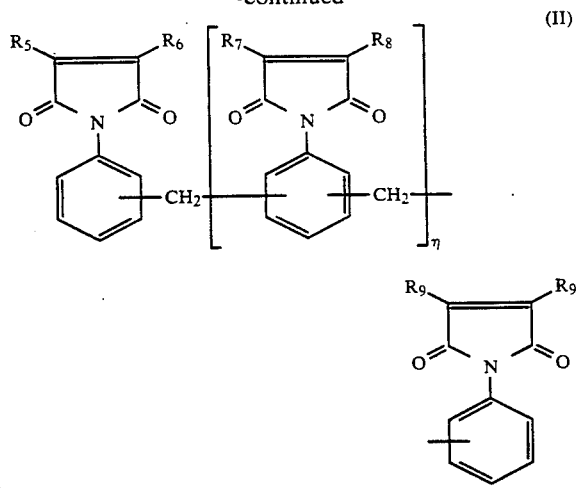

where A is a divalent organic radical of at least two carbon atoms, and $R_1$–$R_{10}$ are the same or different hydrogen atoms, halogen atoms, cyano groups, straight-chain or branched, saturated or unsaturated alkyl radicals having from 1 to 6 carbon atoms, phenyl radicals, or substituted phenyl radicals having one or more substituents selected from straight-chain or branched, substituted or unsubstituted alkyl radicals, halogen atoms, cyano groups, and where n is a positive integer; and, (b) at least one ether derivative of alkenylphenol having the general formula:

wherein X is

—CH=CH—R, or

—CH₂—CH=CH—R; and wherein Y is

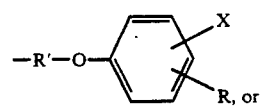

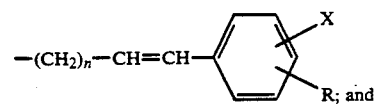

where R is defined as $R_1$–$R_{10}$ in formulas (i) and (ii) above, and where R' is either a divalent organic radical of at least two carbon atoms selected from aliphatic, alicyclic, aromatic or heterocyclic radicals or a divalent organic radical of the general formula:

—CH₂—Ph—CH₂—, —Ph—CO—Ph—CO—Ph, —Ph—C(—Ph)—Ph,

-continued

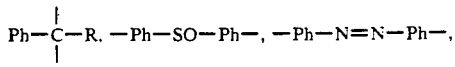

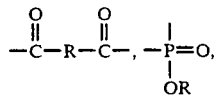

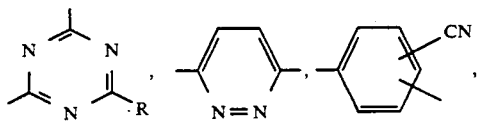

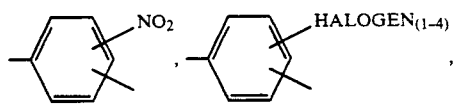

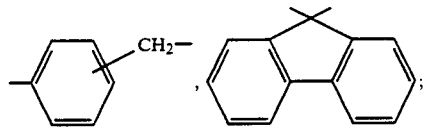

and where R is defined as $R_1$–$R_{10}$ in formulas (i) and (ii) above, and where n is a positive integer; and where the oxygen atom that connects Y and the aromatic ring can also be replaced by a sulfur atom.

Any polyfunctional maleimide compound known in the prior art may be suitable for this invention including, for example, commercially available bismaleimide resins from Technochemie, Ciba-Geigy and Mitsubishi such as bismaleimides of methylene dianiline, diamino benzene and diamino toluene. Further, polyfunctional maleimide compounds such as disclosed in U.S. Pat. Nos. 4,463,147; 4,389,516; 4,298,720; 4,179,551; 4,100,140; and 4,035,345, of which are expressly incorporated herein, are suitable for use in this invention.

Specific examples of such polyfunctional maleimide compounds suitable for use in this invention include:
N,N'-4,4'-diphenylmethane-bis-maleimide,
N,N'-ethylene-bis-maleimide,
N,N'-ethylene-bis(2-methylmaleimide),
N,N'-trimethylene-bis-maleimide,
N,N'-tetramethylene-bis-maleimide,
N,N'-hexamethylene-bis-maleimide,
N,N'-1,4,-cyclohexylene-bis-maleimide,
N,N'-meta-phenylene-bis-maleimide,
N,N'-para-phenylene-bis-maleimide,
N,N'-2,4-toluene-bis-maleimide,
N,N'-2,6-toluene-bis-maleimide,
N,N'-4,4'-diphenylmethane-bis-maleimide,
N,N'-4,4'-3,3'-dichloro-diphenylmethane-bis-maleimide,
N,N'-4,4'-diphenyl-ether-bis-maleimide,
N,N'-4,4'-diphenylsuphone-bis-maleimide,
N,N'-4,4'-dicyclohexylmethane-bis-maleimide,
N,N'-α,α'-4,4'-dimethylenecyclohexane-bis-maleimide,
N,N'-meta-xylene-bis-maleimide,
N,N'-para-xylene-bis-maleimide,
N,N'-4,4'-diphenyl-cyclohexane-bis-maleimide,
N,N'-meta-phenylene-bis-tetrahydrophthalimide,
N,N'-4,4'-diphenylmethane-bis-citraconimide,
N,N'-4,4'-2,2-diphenylpropane-bis-maleimide,
N,N'-4,4-1,1-diphenyl-propane-bis-maleimide,
N,N'-4,4'-triphenylmethane-bis-maleimide,
N,N'-α,α'-1,3-dipropylene-5,5-dimethyl-hydantoin-bis-maleimide,
N,N'-4,4'-(1,1,1-triphenyl ethane)-bis-maleimide,
N,N'-3,5-triazole-1,2,4-bis-maleimide,
N,N'-4,4'-diphenyl-methane-bis-itaconimide,
N,N'-para-phenylene-bis-itaconimide,
N,N'-4,4'-diphenylmethane-bis-dimethyl-maleimide,
N,N'-4,4'-2,2-diphenylpropane-bis-dimethylmaleimide,
N,N'-hexamethylene-bis-dimethyl-maleimide,
N,N'-4,4'-(diphenyl ether)-bis-dimethyl-maleimide,
N,N'-4,4'-diphenylsulphone-bis-dimethylmaleimide,
N,N'-(oxydi-para-phenylene)-bis-maleimide,
N,N'-(oxydi-para-phenylene)-bis-(2-methyl-maleimide),
N,N'-(methylenedi-para-phenylene)bis-maleimide,
N,N'-(methylenedi-para-phenylene)bis-(2-methylmaleimide),
N,N'-(methylenedi-para-phenylene)bis(2-phenylmaleimide),
N,N'-(sulfonyldi-para-phenylene)bis-maleimide,
N,N'-(thiodi-para-phenylene)bis-maleimide,
N,N'-(dithiodi-para-phenylene)bis-maleimide,
N,N'-(sulfonyldi-meta-phenylene)bis-maleimide,
N,N'-(ortho, para-isopropylidenediphenylene)bis-maleimide,
N,N'-(isopropylidenedi-para-phenylene)bis-maleimide,
N,N'-(ortho,para-cyclohexylidenediphenylene)bis-maleimide,
N,N'-(cyclohexylidendi-para-phenylene)bis-maleimide,
N,N'-(ethylenedi-para-phenylene)bis-maleimide,
N,N'-(4,4''-para-triphenylene)bis-maleimide,
N,N'-(para-phenylenedioxydi-para-phenylene)bis-maleimide,
N,N'-(methylenedi-para-phenylene)bis-(2,3,-dichloromaleimide),
and    N,N'-(oxydi-para-phenylene)bis(2-chloromaleimide).

The thermosettable resin compositions of this invention, of course, can comprise more than one type of polyfunctional maleimide compound as set forth above, and may comprise a mixture of several such compounds.

It is preferable, however, to use N,N'-4,4'-diphenylmethane-bis-maleimide in this invention.

Specific examples of ether derivatives of alkenylphenols for use in this invention include:
1,4-bis-eugenoxybutane,
1,3-bis-eugenoxypropane,
1,3-bis-isoeugenoxypropane,
α,α'-bis(ortho-propenylphenoxy)-para-xylene,
1,3-bis-(isoeugenoxy)-2-hydroxy-propane,
1,3-bis-(ortho-propenylphenoxy)propane,
α,α'-bis-(2-propenylphenoxy)-meta-xylene,
α,α'-bis-eugenoxy-para-xylene,
1,5,-bis-eugenoxypentane,
1,6-bis-eugenoxyhexane,
α,α'-bis-isoeugenoxy-para-xylene,
α,α'-bis-eugenoxy-meta-xylene,
α,α'-bis-(ortho-propenylphenoxy)-meta-xylene,
bis-(ortho-propenylphenoxy)-meta-xylene, and,
para-bis(ortho-propenylphenoxy)-meta-xylene.

The aforementioned ether derivatives of alkenylphenol can be prepared from nucleophilic substitution of eugenol, isoeugenol, allylphenol or propenylphenol in the presence of an alkali metal hydroxide and suitable solvents at temperatures ranging from about ambient to about 150° C. to form the alkenyl ethers therefrom via condensation (elimination of the alkali metal and ether formation).

The following examples more fully illustrate the preparation of such ether derivatives of alkenylphenol as set forth above. They are not intended, however, to limit the present invention in any way thereto.

EXAMPLE I 1,4-bis-eugenoxybutane is prepared according to the following procedure.

100.5 grams (0.61 moles) of eugenol and 1 liter of isopropyl alcohol (IPA) are added to a flask equipped with a mechanical stirrer, a nitrogen inlet and a bubbler. After sparging with nitrogen for 15 minutes, an aqueous potassium hydroxide solution of 7.93 millieqivalents/-gram (76.5 grams, 0.61 moles) is added to the contents of the flask. The mixture is stirred for 15 minutes, then 60.6 grams of 1,4-dibromobutane (0.28 moles) and 4 milliliters of tricaprylyl methyl ammonium chloride is added thereto. The resulting mixture is then stirred at 45° C. for 16 hours, during which time a precipitate forms. Filtration thereof followed by subsequent aqueous washing fields 89 grams of a white powder (83% yield) of melting point 101°–102° C.

EXAMPLE II 1,3-bis-eugenoxypropane is prepared in a procedure similar to Example I, except that 98.5 grams (0.60 mole) of eugenol is employed along with 60.6 grams (0.30 mole) of 1,3-dibromopropane to yield 80 grams (72% yield) of a crystalline material having a melting point of 79°–80° C.

EXAMPLE III 1,3-bis-isoeugenoxypropane is prepared in a procedure similar to Example I, except that 100 grams (0.61 mole) of isoeugenol is employed along with 65.5 grams (0.30 mole) of 1,3-dibromopropane to yield 72 grams (72% yield) of a crystalline material with melting point 103°–106° C.

EXAMPLE IV $\alpha,\alpha'$-bis-(ortho-propenylphenoxy)-para-xylene is prepared in a procedure similar to Example I, except that 459.3 grams (3.4 moles) of 2-allylphenol is employed along with 300 grams (1.7 mole) of dichloro-para-xylene to yield 597 grams (95% yield) of a white crystalline solid having a melting point of 50°–53° C.

EXAMPLE V 1,3-bis-(isoeugenoxy)-2-hydroxy-propane is prepared in a procedure similar to Example I, except that 300 grams (1.83 moles) of isoeugenol is employed along with 199 grams (0.91 moles) of 1,3-dibromo-2-propanol to give a product that is precipitated in hexane. 262 grams of an off-white powder is recovered having a melting point of 79°–82° C.

EXAMPLE VI 1,3-bis(ortho-propenylphenoxy)propane is prepared in a procedure similar to Example I, except that 537 grams (4.0 moles) of prophenyl phenol is employed along with 403 grams (1.98 moles) of 1,3-dibromo-propane to product a reaction mixture extracted with methylene chloride and dried over magnesium sulfate, then vacuum distilled to give 311 grams (50% yield) of a solid with melting point 45°–48° C.

EXAMPLE VII $\alpha,\alpha'$-bis-(2-propenylphenoxy)-meta-xylene is prepared in a process similar to Example I, except that 383 grams (2.86 mole) of propenylphenol is employed along with 250 grams (1.43 moles) of $\alpha,\alpha'$-dichloro-meta-xylene to give a reaction product extracted with methylene chloride, washed with potassium hydroxide and dried over magnesium sulfate, then vacuum distilled at 80° C. to yield 407 grams of a viscous liquid (80% yield).

EXAMPLE VIII $\alpha,\alpha'$bis-eugenoxy-para-xylene is prepared in a procedure similar to Example I, except that 62.2 grams (0.38 moles) of eugenol is employed along with 50 grams (0.19 mole) of $\alpha,\alpha'$-dibromo-para-xylene to produce 80.3 grams of a solid (98% yield) having a melting point of 106°–107° C.

EXAMPLE IX 1,5-bis-eugenoxypentane is prepared in a procedure similar to Example I, except that 100 grams (0.61 mole) of eugenol is employed along with 70 grams (0.30 mole) of 1,5-dibromopentane to produce 98.4 grams (83% yield) of a solid having melting point 68°–69° C.

EXAMPLE X 1,6-bis-eugenoxyhexane is prepared in a procedure similar to Example I, except that 100 grams (0.61 mole) of eugenol is employed along with 74.3 grams (0.30 mole) 1,6-dibromohexane to give 101 grams (82% yield) of a solid with melting point 72°–73° C.

EXAMPLE XI $\alpha,\alpha'$-bis-isoeugenoxy-para-xylene is prepared in a procedure similar to Example I, except that 68.8 grams (0.42 mole) of isoeugenol is employed with 55.3 grams (0.21 mole) of $\alpha,\alpha'$-dibromo-para-xylene to give 80 grams (89% yield) of a solid with melting point of 136°–140° C.

EXAMPLE XII $\alpha,\alpha'$-bis-eugenoxy-meta-xylene is prepared in a procedure similar to Example I, except that 1.76 grams (1.07 mole) of eugenol is employed along with 94 grams (0.54 mole) of $\alpha,\alpha'$-dichloro-meta-xylene to give 208 grams (90% yield) of a solid with melting point 49°–50° C.

EXAMPLE XIII $\alpha,\alpha'$-bis(ortho-propenylphenoxy)-para-xylene is prepared according to the following procedure.

A mixture of 200 grams (0.76 mole) of $\alpha,\alpha'$-dibromo-para-xylene, 240 grams (1.8 mole) of ortho-propenyl-phenol, 300 grams (2.2 moles) of potassium carbonate, 10 milliliters of tricaprylyl methyl ammonium chloride, and 3 liters of acetone is heated to boiling for 24 hours. The inorganic salt is filtered and washed 200 milliliters of acetone, then the organic portion is extracted with a 1M sodium hydroxide solution to remove excess phenol, followed by aqueous washing. The organic layer is then dried over sodium sulfate and the solvent removed under vacuum to give 250 grams (80% yield) of a liquid.

Additionally, the thermosettable resin compositions of this invention may contain more than one type of alkenylphenol ether derivatives as set out above, and may comprise several such compounds.

Of the aforementioned alkenylphenol ether derivatives, α,α'-bis-(ortho-propenylphenoxy)-para-xylene and α,α'-bis-(2-propenylphenoxy)-meta-xylene are preferred.

In accordance with this invention, the alkenylphenol ether derivatives can be reacted with the various polyfunctional maleimide compounds heretofore mentioned to produce a readily processable resin matrix having high heat resistance.

Broadly speaking, it is believed that the reaction mechanism of the polyfunctional maleimide compounds and the ether derivatives of alkenylphenol can proceed through a (1) free radical type reaction or a (2) ene type reaction or a (3) diels-alder type reaction of the two compounds, depending on the position of unsaturation on the alkenylphenol ether derivative. A subsequent diels-adler type reaction may follow depending upon reaction conditions. It is to be understood, however, that this invention is not intended to be limited in any way to such reactions. The above-mentioned reactions, which of course, are well known in the prior art can be represented as follows:

Reaction 1: FREE RADICAL TYPE REACTION

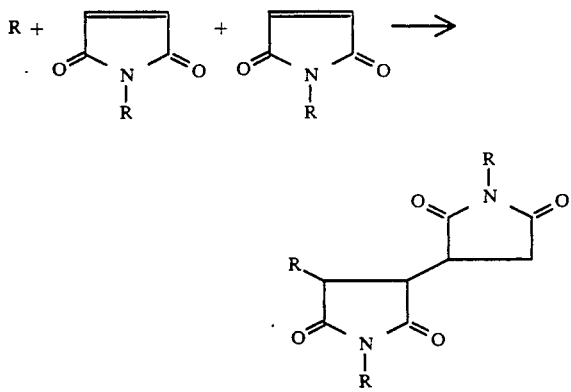

Reaction 2: ENE TYPE REACTION

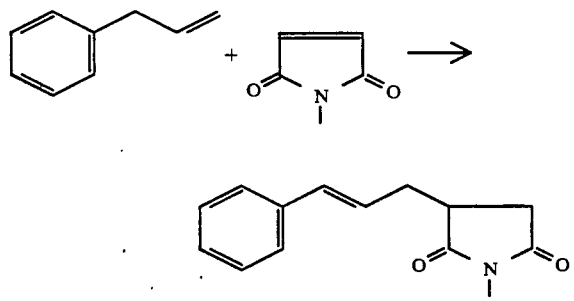

Reaction 3: DIELS-ALDER TYPE REACTION

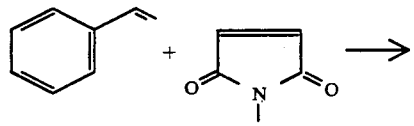

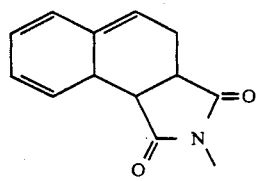

In preparing cured resin matrixes from reaction mixtures of polyfunctional maleimides and alkenylphenol ether derivatives, such mixture compositions are subject to wide variation depending upon, for example, the particular polyfunctional maleimides and alkenylphenol ether derivatives employed therein, and the specific resin end uses contemplated. Accordingly, weight percent ratios of polyfunctional maleimide to alkenylphenol ether derivatives will range generally from about 0.5:1 to about 10:1, and preferably from about 1.3:1 to about 2.0:1.

Cure temperatures can range from about ambient to about 270° C. over a time span from about 2 hours to in excess of 24 hours. A preferred curing schedule is as follows: 3 hours at 130° C., 2 hours at 150° C. and 5 hours at 250° C. A more preferable curing schedule is 2 hours at 180° C. and 5 hours at 250° C. Optionally, curing may be accomplished in an autoclave under pressure, followed by a post cure according to schedules as set forth above. Of course, other curing schedules may be employed, again, depending upon the particular polyfunctional maleimide-alkenylphenol ether derivative mixture employed and specific resin end uses contemplated.

The curable polyfunctional maleimide components of this invention are normally provided to the uncured reaction mixture in a solvent free state, e.g., a solid form total maleimide resin. However, non-reactive solvents may be employed wherein the maleimide component can be used in the form of a solution. Examples of suitable solvents include N-methyl-2-pyrrolidone, dimethylformamide, dimethylacetamide, dimethylsulfoxide, dioxane, acetone, methyl ethyl ketone, tetrahydrofuran, cellosolve, methyl acetate, ethyl acetate, chloroform, benzene, toluene, xylene, chlorobenzene, and tetramethyl urea.

Accordingly, the total uncured thermosettable resin composition mixture of this invention comprising the polyfunctional maleimide and alkenylphenol ether derivative compounds can be used in the form of a solution by dissolving the mixture in a solvent such as mentioned above.

Depending upon a particular application, any of the thermosettable resin compositions of this invention can be admixed with one or more additional components to modify the properties of the cured resin matrix end product, provided that such additives do not adversely affect cure. Examples of such components include inorganic fillers such as silica, silica glass, clay, aluminum hydroxide, asbestos, mica, gypsum, kaolin, cement, talc, calcium carbonate and the like. In similar fashion, catalysts, stabilizers, free radical initiators, tackifiers, antioxidants, plasticizers, pigments, dyestuffs, mold release agents and flame retardant compounds, may be added to the thermosettable resin compositions of this invention. Still further, other components which can be added to the resin compositions of this invention to optimize said resins for various end uses include reactive rubbers and thermoplastics.

Thermosettable resin compositions of this invention can be used as an impregnating resin varnish to coat continuous (filimentary) fibers such as carbon (graphite), for example, high-performance polyacrylonitrile (pan)-based carbon fibers and pitch-based carbon fibers, or, glass, boron, silica, ceramic, silicon carbide, aluminum oxide and other metal oxide fibers, polybenzimidazole, polyethylene, bicomponent polyethylene and polypropylene fibers, polyimide, or mixtures thereof to manufacture prepregs. In addition, fibers such as alumina-boria-silica, produced from a combination of the oxides of aluminum, boron and silicon and available from the Minnesota Mining and Manufacturing Company, PBZ a family of heterocyclic, rigid rod and chain extended polymers available from the Dow Chemical Company, and aramid (Kevlar) available from E. I. du Pont de Nemours and Company, Inc. may be used in conjunction with this invention to manufacture prepregs.

The prepregs can comprise about 20 to about 50 weight percent, preferably about 25 to about 40 weight percent, of the thermosettable resin compositions of this invention, and about 50 to about 80 weight percent, preferably about 60 to about 75 weight percent, of continuous fibers such as mentioned above, of which high strength thermally stable fibers such as carbon, boron or glass are preferred. Such fibers are coated with the thermosettable resin compositions of this invention as a hot melt or solution using processing conditions known in the art.

Composites comprising a multiplicity of continuous fibers can then be prepared from the prepregs by any method known in the art. For example, such composites can be prepared by stacking layer upon layer of the fiber prepregs, where applicable, in the same or opposite direction to provide a mat or dispersion where applicable, of desired thickness and which are cured in stages as generally described herein. Curing is generally carried out at 180° C. for two hours under vacuum and about 80 psi, then at 230° C. for two hours under free standing conditions, then at 250° C. for five hours under free standing conditions. Of course, other curing schedules may be employed, depending upon the particular fibers employed in prepreg manufacture, and the specific composite end uses contemplated.

Examples of applications for fiber reinforced composites fabricated from prepregs comprising thermosettable resin compositions of this invention include the manufacture of primary, secondary and empennage structures for both commercial and military aircraft. Such composites are also useful in other aerospace applications where there are demands for heat resistant products lighter in weight and longer lasting than basic materials such as metal, aluminum and titanium. Similarly, such composites may also be employed in the manufacture of products for the automobile and electronics industry. The wide spectrum of applications within which the invention herein may be useful will be readily apparent to those skilled in the art.

The following examples further illustrate a preferred embodiment of this invention. It is to be understood, however, that the invention is not in any way limited thereto.

EXAMPLES XIV-XVII

The following examples illustrate the preparation of thermosettable resin compositions of this invention comprising matrixes of 1,3-bis(ortho-propenylphenoxy)propane, and 1,3-bis-(isoeugenoxy)-2-hydroxy-propane with Technochemie's Compimide 353, a commercially available mixture of amino maleimide, bis-maleimide and chain extended maleimides (reference, Polymer Journal 1983, 15. p.2).

In Example XIV, 66.6 grams (60% weight) of Compimide 353 is melted in a flask equipped with a mechanical stirrer at 80° C. for 20 minutes. Then, 11.1 grams (10% weight) of 1,3,-bis(ortho-propenylphenoxy)propane and 33.3 grams (30% weight) 1,3-bis-(isoeugenoxy)-2-hydroxy propane is added to the melt, and the resulting mixture stirred for an additional 20 minutes of 80° C. The contents of the flask is poured into a pan, degassed under vacuum of 80° C. for 10 minutes, then poured into a mold for curing. The resin at this stage is tacky and flows well. Resin curing is accomplished according to the following schedule: 3 hours at 130° C., 2 hours at 150° C. and 5 hours at 250° C. A plaque consisting of the cured resin matrix is formed then cut into test specimens.

Examples XV-XVII are repeats of Example XV, except that the weight percent addition of components is altered according to the following table, in addition to stabilizers phenothiazine and hydroquinone being added to Examples XVI and XVII in the indicated amounts.

Prior to curing according to the schedule set forth in Example XV above, the resin compositions of Examples XVI-XVII are tacky and flow well.

TABLE I

| | Grams (weight %) | | | |
| --- | --- | --- | --- | --- |
| | XIV | XV | XVI | XVII |
| Compimide 353 | 66.6 (60) | 59.1 (57) | 61 (61) | 61 (61) |
| 1,3-bis(ortho-propenyl-phenoxy)propane | 11.1 (10) | 9.8 (9.5) | 18.3 (18.3) | 18.3 (18.3) |
| 1,3-bis-(isoeugenoxy)-2-hydroxy propane | 33.3 (30) | 34.5 (33.4) | 18.3 (18.3) | 18.3 (18.3) |
| phenothiazine | | | | 2 (2) |
| hydroquinone | | 2 (2) | | |

EXAMPLES XVIII-XXV

The following examples illustrate the preparation of other preferred polyfunctional maleimide-based thermosettable resin compositions of this invention.

In Example XVIII, a mixture of 53 grams (59 weight %) of N,N'-4,4'-diphenylmethane-bis-maleimide and 37 grams (41 weight %) of α,α'-bis(ortho-propenylphenoxy)meta-xylene are melted together at 130° C. for one hour. The homogeneous melt is tacky at temperatures above 30 ° C. and has good flow properties. The mixture is then cured in a mold according to the following schedule: 5 hours at 130° C., 2 hours at 180° C., 2 hours at 230° C. and 5 hours at 250° C.

In Example XIX, a mixture of 12 grams (36 weight %) of Compimide 353, 8 grams (24 % weight) N,N'-4,4'-diphenylmethane-bis-maleimide, 13 grams (39 weight %) α,α'-bis-(ortho-propenylphenoxy)meta-xylene and 0.07 grams hydroquinone are melted together and cured according to the schedule set forth in XVIII.

In Example XX, a mixture of 5.3 grams (64 weight %) Compimide 353 and 3 grams (36 weight %) α,α'-bis-(ortho-propenylphenoxy)meta-xylene are melted and cured together according to the schedule set forth in XVIII.

Example XXI is prepared from a mixture of 31 grams (37 weight %) of α,α'-bis(ortho-propenylphenoxy)para-xylene and 51.8 grams (63% weight) Compimide-353 which is melted together at 120° C. for 10 minutes, degassed, then cured in a mold according to the schedule described in XVIII.

In Example XXII, 3.1 grams (35 weight %) α,α'-bis-(ortho-propenylphenoxy)para-xylene, 5.2 grams (59% weight) Compimide 353, and 0.50 grams (6% weight) aminopropyl terminated dimethyl diloxane (MW=30,000), a reactive rubber compound, are mixed and cured together according to the schedule set out in XVIII.

In Example XXIII, a mixture of 53 grams (59% weight) N,N'-4,4'-diphenylmethane-bis-maleimide and 37 grams (41% weight)α,α'-bis-(2-propenylphenoxy)-meta-xylene is melted together at 130° C. for one hour. The homogeneous melt is tacky above temperatures of 30° C. and has a good flow property. The mixture is then cured according to the schedule described in Example XVIII.

Example XVIV is prepared from a mixture of 12 grams (36% weight) Compimide 353, 8 grams (24% weight) N,N'-4,4'-diphenylmethane-bis-maleimide (commercially available as Ciba-Geigy's XV-292A), 13 grams (39% weight) α,α'-bis-(2-propenylphenoxy)-meta-xylene and 1% weight hydroquinone as a stabilizer, which are melted together and then cured according to the schedule set out in XVIII.

Example XXV is prepared from a mixture of 5.3 grams (63% weight) Compimide 353, 3 grams (36% weight) α,α'-bis-(2-propenylphenoxy)-meta-xylene and 1% weight hydroquinone which are melted together and subsequently cured according to the schedule described in XVIII.

Table 2 below summarizes the preparation of Examples XVIII–XXV as described below.

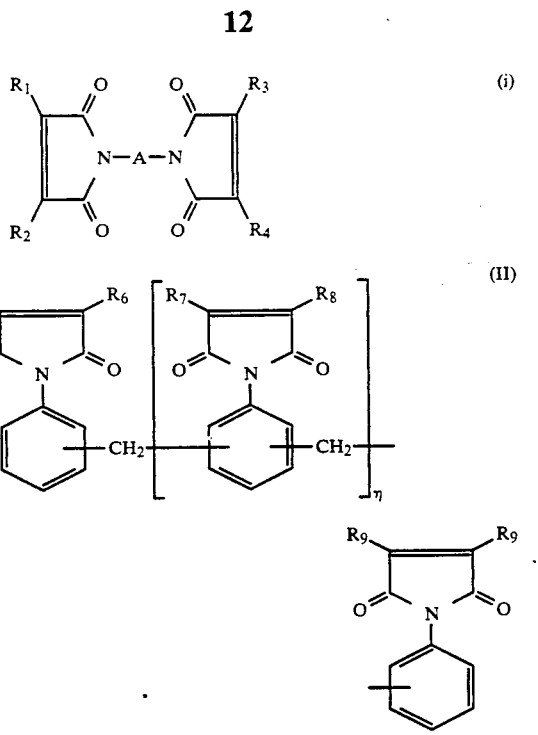

where A is a divalent organic radical of at least two carbon atoms and $R_1$–$R_{10}$ are the same or different hydrogen atoms, halogen atoms, cyano groups, straight-chain or branched, saturated or unsaturated alkyl radicals having from 1 to 6 carbon atoms, phenyl radicals or substituted phenyl radicals having one or more substituents selected from straight-chain or branched, substituted or unsubstituted alkyl radicals, halogen atoms or, cyano groups, and where n is a positive integer; and, (b) at least one ether derivative of alkenylphenol selected from the group consisting of compounds having the general formula:

TABLE 2

| | Grams (% weight) | | | | | | | |
|---|---|---|---|---|---|---|---|---|
| | XVIII | XIX | XX | XXI | XXII | XXIII | XXIV | XXV |
| Compimide 353 | | 12 (36) | 5.3 (64) | 51.8 (63) | 5.2 (59) | | 12 (36) | 5.3 (63) |
| N,N'-4,4'-diphenyl-methane-bis-maleimide | 53 (59) | 8 (24) | | | | 53 (59) | 8 (24) | |
| α,α'-bis(ortho-propenyl phenoxy)-meta-xylene | 37 (41) | 13 (39) | 3 (36) | | | | | |
| α,α'-bis(ortho-propenyl-phenoxy)-para-xylene | | | | 31 (37) | 3.1 (35) | | | |
| α,α'-bis-2-propenyl-phenoxy-meta-xylene | | | | | | 37 (41) | 13 (39) | 3 (36) |
| hydroquinone | | | | | | | (1) | (1) |
| aminopropyl terminated dimethyl siloxane (MW = 30,000) | | | | | 0.5 (6) | | | |

I claim:
1. A thermosettable resin composition comprising
(a) at least one polyfunctional maleimide compound selected from the group consisting of (i) bis-maleimide and (ii) polymaleimide, having the respective general formulas:

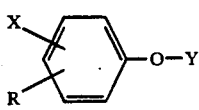

where X is

—CH=CH—R, or

—CH₂—CH=CH—R, and
where Y is

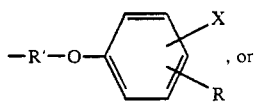, or

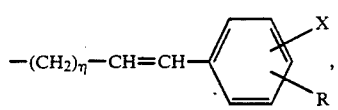, and where R is defined as $R_1$–$R_{10}$ in formulas (i) and (ii) above, and where R' is either a divalent organic radical of at least two carbon atoms selected from aliphatic, alicyclic, aromatic or heterocyclic radicals or a divalent organic radical of the general formula:

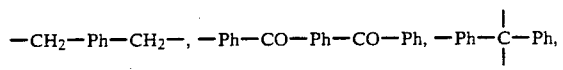

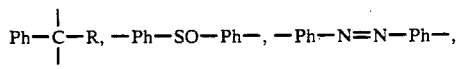

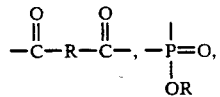

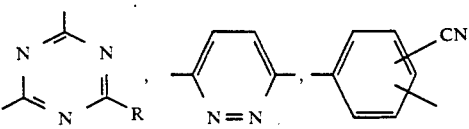

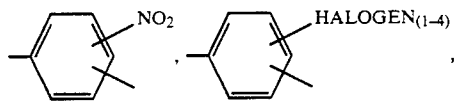

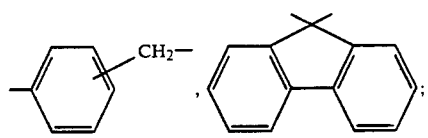

and where R is defined as $R_1$–$R_{10}$ in formulas (i) and (ii) above, and where n is a positive integer; and where the oxygen atom that connects Y and the aromatic ring can also be replaced by a sulfur atom.

2. A composition according to claim 1 wherein (a) is N,N'-4,4'-diphenylmethane-bis-maleimide.

3. A composition according to claim 1 wherein (b) is α,α'-bis-(ortho-propenylphenoxy)-para-xylene.

4. A composition according to claim 1 wherein (b) is α,α'-bis-(2-propenylphenoxy)-meta-xylene.

5. A composition as claimed in claim 1 wherein the weight percent ratio of polyfunctional maleimide compound to ether derivative of alkenylphenol is from about 0.5:1 to about 10:1.

6. The composition as claimed in claim 1 wherein the weight percent ratio of polyfunctional maleimide compound to ether derivative of alkenylphenol is from about 1.3:1 to about 2:1.

* * * * *

UNITED STATES PATENT AND TRADEMARK OFFICE
CERTIFICATE OF CORRECTION

PATENT NO. : 5,095,074

DATED : March 10, 1992

INVENTOR(S) : Sung G. Chu, Harold Jabloner and Tuyen T. Nguyen (Case 2-6)

It is certified that error appears in the above-identified patent and that said Letters Patent is hereby corrected as shown below:

Col. 1, line 24 after "composite" insert --fabrication. In recent years, such advanced fiber composites--;

Col. 2, between lines 14 and 19 in the formula,

"$R_9 \!=\! R_9$" should read --$R_9 \!=\! R_{10}$--;

Col. 2, line 65 "-Ph-CO-Ph-CO-Ph," should read
-- -Ph-CO-Ph-CO-Ph-," and "
$\begin{array}{c}\phantom{-}|\\-Ph-C-Ph,\\\phantom{-}|\end{array}$
" should read
--
$\begin{array}{c}\phantom{-}|\\-Ph-C-Ph,\\\phantom{-}|\end{array}$
--;

Col. 5, line 65, "product" should read --produce--;

Col. 11, line 15, "diloxane" should read --siloxane--;

Col. 11, line 27, "Example XVIV" should read "Example XXIV";

In the Claims, Col. 12, between lines 20 and 26,
"$R_9 \!=\! R_9$" should read --$R_9 \!=\! R_{10}$--;

UNITED STATES PATENT AND TRADEMARK OFFICE
CERTIFICATE OF CORRECTION

PATENT NO. : 5,095,074

DATED : March 10, 1992

INVENTOR(S) : Sung G. Chu, Harold Jabloner and Tuyen T. Nguyen (Case 2-6)

It is certified that error appears in the above-identified patent and that said Letters Patent is hereby corrected as shown below:

Col. 13, line 26, "-CH$_2$-Ph-CH$_2$-, -Ph-CO-Ph-CO-Ph, $$-Ph-\overset{|}{\underset{|}{C}}-Ph,"$$

should read "-CH$_2$-Ph-CH$_2$, -Ph-CO-Ph-CO-Ph-, $$Ph-\overset{|}{\underset{|}{C}}-Ph,".$$

Signed and Sealed this

Twenty-first Day of September, 1993

Attest:

BRUCE LEHMAN

Attesting Officer     *Commissioner of Patents and Trademarks*